Feb. 6, 1962  J. H. D. WALTON  3,020,475
ELECTRICAL NULL TRANSMISSION NETWORKS
Filed July 7, 1959

United States Patent Office 3,020,475
Patented Feb. 6, 1962

3,020,475
ELECTRICAL NULL TRANSMISSION NETWORKS
John Hugh Davey Walton, Folkestone, England, assignor to Mec-Test Limited, London, England, a company of Great Britain and Northern Ireland
Filed July 7, 1959, Ser. No. 825,597
5 Claims. (Cl. 324—41)

This invention relates to apparatus employing an electrical bridge or null transmission network for testing electrical components or detecting ferro magnetic or electrically conducting objects in a region of space. Means are already known for detecting metal in a space region, e.g. mine detectors.

In previous arrangements one main disadvantage is that the apparatus cannot satisfactorily be left unattended for long periods. This is partly because of the disturbing effect of mechanical movement, e.g. thermal expansion of search coils employed, since any slight movement will alter the inductance. Also previous arrangements require special and accurately dimensioned formers for the search coils.

Another cause of long term instability lies in the use of electronic amplifiers, having time varying elements.

One type of previous equipment has used a null transmission network consisting of balanced mutual inductances. This system works on the principle of having two pairs of magnetically coupled coils the primary and secondary windings of which are respectively connected in series, so that with the passage of an alternating current through the primaries the voltages induced in the secondaries tend to concel each other out. Upon bringing a magnetic or electrically conductive object within the field of one of these primary coils the voltage in the associated secondary coil is disturbed in both magnitude and in phase relative to the primary current.

For example if the said secondary voltages are arranged so that normally they exactly cancel each other, then the introduction of an object will result in an out of balance voltage appearing across the two secondary coils in series, which voltage after amplification may be used to operate a relay and provide an appropriate signal.

This simple system has been found to be unsatisfactory because (a) Mechanical movements of coils or associated connecting wires also cause an out of balance voltage to be produced.

(b) A change of sensitivity of the amplifier for example, impairs the ability of the equipment to discriminate between large and small amounts of material within the field of the coil.

According to the present invention there is provided apparatus comprising an electrical null transmission network, which includes a mutual inductance element having primary and secondary windings and a ferro magnetic core, and having a third winding capable of producing saturation in the said core thereby varying the mutual inductance between the primary and secondary windings; a phase sensitive rectifier energized by the signal transmitted through the said null transmission network due to departure of its elements from their null condition; and means for connecting the output from said phase sensitive rectifier to the said third winding, so as to maintain as nearly as possible the null condition.

Preferably the null transmission network comprises two sets of coupled coils, the primaries of which are connected in series, and secondaries in series opposition. The mutual inductance element may be one of the pairs of coupled coils; or it may be a separate component having its primary and secondary windings respectively connected in series with corresponding windings of the said pair of coupled coils.

The invention will now be described in greater detail with reference to the accompanying drawings in which.

Figure 1:
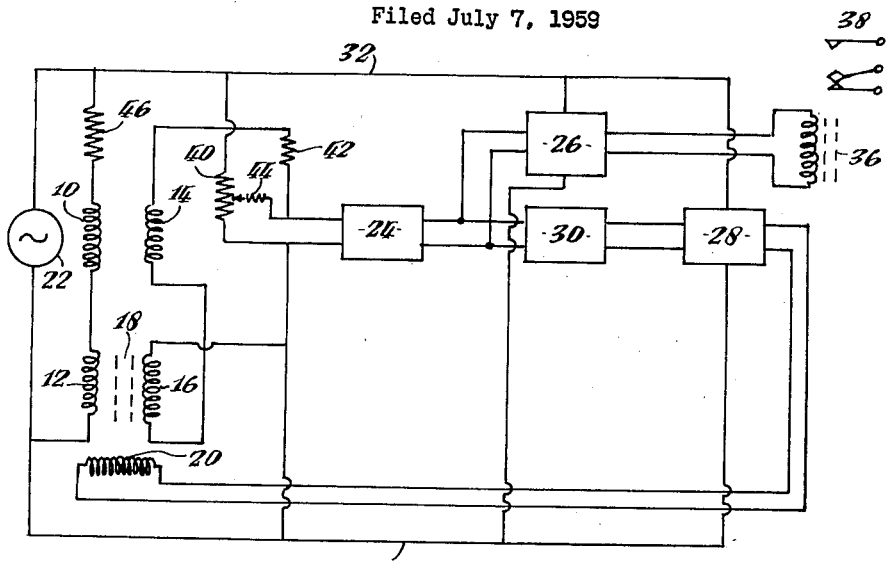
FIG. 1 is a block circuit diagram of one simple embodiment of an electrical null transmission network.
Figure 2:
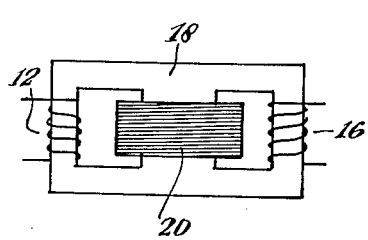
FIG. 2 shows the disposition of the windings shown in FIG. 1 on the core.

The equipment is used for detecting the presence of a conducting or magnetic object in a region of space. With reference to FIGS. 1 and 2 the null transmission network comprises two sets of coupled coils the primaries 10 and 12 of which are connected in series and the secondaries 14 and 16 in series opposition, one of said pairs having a magnetic core 18 provided with a third winding 20. The first pair of coupled coils namely 10 and 14 hereinafter called the search coils are so arranged that their associated magnetic fields traverse the aforesaid region of space. The primaries 10 and 12 of said coils in series are energized from a transistor oscillator 22. The small resultant voltage appearing across the secondary windings 14 and 16 is amplified by an amplifier 24 and applied to two phase sensitive rectifiers 26 and 28. A 90° phase shifting network 30 is provided between the amplifier 24 and the phase sensitive rectifier 28, both rectifiers 26 and 28 being fed with a reference voltage derived from the transistor oscillator 22 through leads 32 and 34. The output from the phase sensitive rectifier 28 is connected to the third winding 20 on the said magnetic core 18. This third winding 20, when energized with direct current from the output of the phase sensitive rectifier 28, saturates the magnetic core 18 to a degree dependent on the magnitude of the direct current from rectifier 28, thereby varying the A.-C. permeability of the magnetic core 18 and hence the mutual inductance between the windings 12 and 16. The output from the other phase sensitive rectifier 26 is fed to a polarized relay 36 the contacts 38 of which are connected in a signalling circuit (not shown). Further means are provided to introduce into the amplifier input circuit an additional manually variable signal of suitable phase to operate the relay in either direction as required. This is done by means of a potentiometer 40 and mixing resistors 42 and 44 connected in the amplifier input circuit as shown in FIGURE 1.

The operation of this embodiment is as follows. In the initial condition, the manually variable signal is so adjusted as to operate the relay 36 in one direction namely to a rest position from which it will be moved by the detection of an object as will appear hereinafter. Due to the feedback action of the circuit the component of signal to which the second phase sensitive rectifier 28 responds is automatically held to a low value and cannot therefore interfere with the action of the first phase sensitive rectifier 26 by reason of overloading. Upon introducing a metallic object in the magnetic field of one of the coils 10 and 14, the field is disturbed, and an out of balance signal produced which is fed to the amplifier 24. That component of the signal to which the first phase sensitive rectifier 26 responds causes the polarized relay 36 to operate by overcoming the existing signal. That component to which the second phase sensitive rectifier 28 responds is reduced to a small magnitude by the feedback action of the circuit as described above. The second phase sensitive rectifier 28 is made to respond to induced voltages 90° out of phase with the primary current by means of a resistance 46, which causes the voltage across the oscillator output to be substantially in phase with the primary current so that such voltages produced by mechanical movements of the coils will be cancelled by the variation of the mutual inductance element and will not affect the operation of the relay 36.

Consider, for example, the effect of a decrease in the mutual inductance between coils 10 and 14 that is due to mechanical displacement, as opposed to the presence in the field of a metal object. Under these circumstances, the induced voltages in the coils 14 and 16 will no longer balance, and a signal voltage will be applied to the amplifier 24. Because the unbalance has resulted from mechanical displacement of the components, rather than from the presence in the field of an energy-consuming metal object, the signal voltage will be wholly in quadrature with the current through the primary coils 10 and 12, having no significant in-phase component. This signal voltage will produce no output from phase sensitive rectifier 26, but it will affect the output of phase sensitive rectifier 28, by reason of the 90° phase shift in the signal produced by the phase-shifting network 30. The signal voltage rectified by rectifier 28 produces a direct-current flow through the coil 20 which increases the degree of saturation of the core 18 and correspondingly decreases the mutual inductance between the coils 12 and 16. Thus the original decrease in mutual inductance between coils 10 and 14 is substantially offset by a corresponding decrease in mutual inductance between coils 12 and 16, substantial balance being thus restored to the circuit. By similar negative-feedback action, an increase in mutual inductance between coils 10 and 14, produced by mechanical displacement, would produce a corresponding increase in the mutual inductance between coils 12 and 16, accomplished by appropriate reduction in the direct current flowing through coil 20 and a corresponding reduction in the degree of saturation of the magnetic core 18.

The negative-feedback action just described occurs only in response to quadrature signals. In-phase signal components, characteristically produced by metal objects in the field of coils 10 and 14, do not cause any feedback action and are, on the contrary, fed to rectifier 26 and thereby made to actuate relay 36.

The presence or absence of an object corresponds to positive and negative voltages respectively applied to the relay to cause the signalling circuit to give a visual or other indication. Variations in voltage levels or amplifier gain cannot affect the polarity of this voltage but only its magnitude; and therefore cannot cause confusion in the indication.

Figure 3:
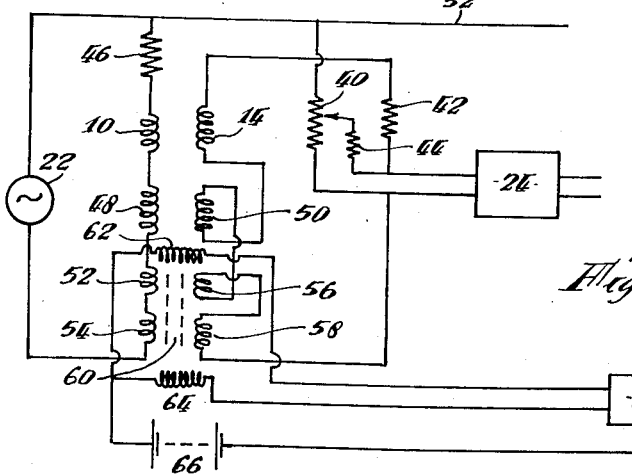
FIG. 3 is a circuit diagram showing a preferred arrangement of the coil system.

A preferred embodiment of the coil system is shown in FIGURE 3 whereby both of the mutual inductance elements are duplicated.

A pair of balancing coils 48 and 50 are connected in series and series opposition with the coils 10 and 14 respectively. The mutual inductance of these balancing coils may be manually variable so that the voltage induced in the secondary winding 50 is equal and opposite to that introduced into winding 14.

Figure 4:
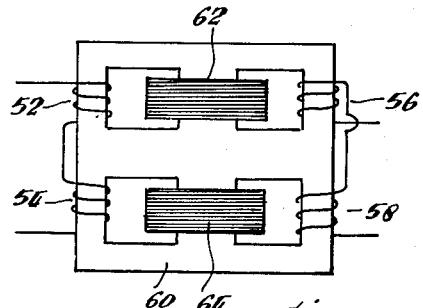
FIG. 4 shows the disposition of the windings shown in FIG. 3 on the core.

The mutual inductance element has primary coils 52 and 54 connected in series and which constitute the winding 12 in the arrangement shown in FIGURE 1. The secondary coils 56 and 58 of this element are connected in series opposition and constitute the winding 16 in the arrangement shown in FIGURE 1. The two pairs of coils 52, 56 and 54, 58 are associated respectively with two identical but separate magnetic paths through the magnetic core 60. This core 60 may consist of two cores 18 as shown in FIGURE 2 joined together the result being as shown in FIGURE 4. A separate polarizing winding is provided for each magnetic path, these windings being designated 62 and 64 respectively.

The transistor oscillator 22 is connected across the primary windings and the resultant output from the secondary windings is fed to the amplifier 24 as shown and described with reference to FIGURE 1. The windings 62 and 64 are fed in series from the output of the phase sensitive rectifier 28, but a comparatively large direct current from a source 66 is introduced at the junction of the windings 62 and 64 and divides equally between them.

If the output from the phase sensitive rectifier 28 is zero, then the two magnetic paths in the core 60 are equally polarized and the resultant induced voltage in the secondaries 56 and 58 is zero. An output from the phase sensitive rectifier 28 of either polarity will cause the currents in windings 62 and 64 to become unequal, hence the polarization of the two magnetic paths are unequal and the resultant signal induced in the windings 56 and 58 is no longer zero. This allows a feedback action to take place as in the previous example.

This particular arrangement as a balanced system possesses greater immunity to variations of temperature and supply voltage than the previously described arrangement.

In both the arrangements described the search coils 10 and 14 can consist of a single loop of co-axial cable, the outer conductor being used as a primary. The mutual inductance is then not sensitive to small relative movements of the conductors.

In the arrangement described in FIGURE 3, the coils 14 and 50 may be wound upon opposite ends of a ferrite rod, the windings 10 and 48 being combined to form one primary winding wound around the centre of the rod. It is obvious that the positions of the primary and secondary windings may be reversed. In these forms the apparatus is capable of detecting metal particles embedded in living flesh such as the human eye. In another arrangement the windings 52, 54, 56 and 58 together with their associated core 60 are omitted, and the windings 62 and 64 are placed on the ferrite rod close to the ends thereof. In this arrangement the primary windings 10 and 48 are positioned close to their corresponding secondaries.

Other examples as to how the preferred embodiment of the invention may be used in practice are given below. The device may be used to count the number of vehicles crossing a certain area of road surface and thus may be used at a cross roads to control the traffic flow. In this case the pair of coils without the magnetic core is laid in the form of cable loops under the surface of the road. As soon as a vehicle approaches these loops the mutual inductance between the coils is altered and an out of balance signal is produced as described above. The relay can thus count the number of vehicles passing over the loops, and can thus be used in conjunction with an electronic computer to solve certain traffic problems, for example vehicles entering a factory or waiting to turn right at a busy intersection can be continuously detected even though they are stationary. Still further examples of the equipment's use are for monitoring a flow of material on a conveyor for metallic impurities, or for detecting the presence of metal containers in the process of counting or batching.

Another application of the equipment in a modified form could enable the safe landing of an aircraft in fog. A number of loops could be provided at the end of the runway in order to determine the position and height of the incoming aircraft. In this way the aircraft could be safely talked down once its position was known, from the change of mutual inductance in the various coils.

While I have described and illustrated two specific embodiments of my invention, it will be clear that variations of the general arrangement and of the details of construction which are specifically illustrated and described may be resorted to without departing from the true spirit and scope of the invention as defined in the appended claims.

What I claim and desire to secure by Letters Patent is:

1. Apparatus for detecting the presence of metallic objects in a region of space, comprising an electrical null transmission network having two sets of coupled coils, each set having primary and secondary windings, the second set of said coils being provided with a ferromagnetic core, A.-C. generator means for driving current through said primary coils, circuit means interconnecting said coils operative to define an output whereat the induced voltages in said secondary coils add to a vector sum of zero when said network is balanced, first and second phase sensitive detecting means connected to said output, and an additional winding on said core capable of producing varying degrees of saturation therein in response to flow of direct current in said additional winding, said first phase sensitive detecting means being responsive to the component of voltage at said output which is in phase with the current in said primary coils, said second phase sensitive detecting means being responsive to the component of voltage at said output which is in quadrature phase relation with the current in said primary coils, said second detecting means being operatively connected to said additional winding for driving direct current therethrough in magnitude proportional to the magnitude of said quadrature voltage component, said direct current in said additional winding being polarized in the direction tending to reduce the magnitude of said quadrature voltage component.

2. Apparatus according to claim 1, wherein the primaries of said two sets of coupled coils are connected in series aiding, and the secondaries in series opposition.

3. Apparatus according to claim 2, wherein said core has three limbs, including a central limb, and said additional winding is mounted on the central limb of said core.

4. Apparatus for detecting the presence of metallic objects in a region of space, comprising an electrical null transmission network having a first set of coupled coils and a second set of coupled coils, at least one coil in each set being a primary coil and at least one other coil in each set being a secondary coil, a ferromagnetic core mounted relative to said second set of coils to provide magnetic coupling therebetween, an additional coil wound on said core, alternating-current generator means connected to the primary coils of said sets, operative to drive alternating current through them, said secondary coils being interconnected in phase relation tending to cancel the voltages induced therein by said primary current, first phase sensitive detecting means fed by the resultant voltage across said secondary coils and responsive to the component thereof which is in phase with said primary current, a second phase sensitive detecting means, circuit means interconnecting said second detecting means with said secondary coils operative to render said second detecting means responsive to the component of resultant voltage across said secondary coils which is in quadrature phase relation to said primary current, and means interconnecting the output of said second detecting means to said additional coil, operative to drive direct current through said coil in a magnitude proportional to the output of said detecting means, the direct current through said coil being operative by negative feedback to vary the degree of saturation of said core and consequently to vary the mutual inductance between said second pair of coils, thereby maintaining an essentially balanced condition in said network in the absence of an external field-distorting factor such as a metal object disposed near the first set of said coils.

5. The apparatus of claim 4, wherein an indicating means is connected to the output of said first phase sensitive detecting means, operative to signal the presence of a field-distorting factor such as a metal object near said first set of coils.

References Cited in the file of this patent

UNITED STATES PATENTS 2,438,197   Wheeler _____ Mar. 23, 1948